United States Patent
Iijima (10) Patent No.: US 6,397,703 B1
(45) Date of Patent: Jun. 4, 2002

(54) CLUTCH CONTROL APPARATUS FOR CONTINUOUSLY VARIABLE TRANSMISSION

(75) Inventor: Makoto Iijima, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/573,605

(22) Filed: May 17, 2000

(30) Foreign Application Priority Data

May 21, 1999 (JP) .......................................... 11-140910

(51) Int. Cl.[7] .......................... F16H 47/02; F16D 33/10
(52) U.S. Cl. ........................ 74/732.1; 192/3.3; 477/39; 477/906
(58) Field of Search ............................. 477/39, 62, 63, 477/64, 168, 169, 176, 906; 74/732.1; 192/3.3, 109 F (56) References Cited

U.S. PATENT DOCUMENTS

| | | | | |
|---|---|---|---|---|
| 5,056,637 A | * | 10/1991 | Miyawaki et al. | 477/39 |
| 5,095,776 A | * | 3/1992 | Sato | 477/39 X |
| 5,211,083 A | * | 5/1993 | Hattori et al. | 477/39 |
| 5,954,618 A | * | 9/1999 | Mikami et al. | 477/176 X |
| 5,989,156 A | * | 11/1999 | Matsubara et al. | 477/169 |

FOREIGN PATENT DOCUMENTS

| | | | | |
|---|---|---|---|---|
| EP | 412711 | * | 2/1991 | 477/39 |
| JP | 198758 | | 4/1989 | |
| JP | 4300448 | * | 10/1992 | 477/176 |

* cited by examiner

Primary Examiner—Rodney H. Bonck
Assistant Examiner—Ha Ho
(74) Attorney, Agent, or Firm—Martin A. Farber (57) ABSTRACT

A clutch control apparatus of a continuously variable transmission comprises a changeover device for changing over an oil passage connected to an apply chamber and a release chamber from an engaged position to a released position and vice versa, a slip pressure regulating device for regulating a slip pressure to be supplied to the release chamber, a lockup control judging device for judging whether or not a lockup clutch is to be engaged or to be released according to traveling conditions of the vehicle and a control device for reducing the slip pressure after a specified time elapses since the oil passage is changed over to the engaged position, when the lockup control judging device judges that the lockup clutch is to be changed over from the released position to the engaged position.

4 Claims, 8 Drawing Sheets

CLUTCH CONTROL APPARATUS FOR CONTINUOUSLY VARIABLE TRANSMISSION

BACKGROUND OF THE INVENTION

1. Field of the Invention

The present invention relates to a control apparatus for a continuously variable transmission, and more particularly, to a control apparatus for controlling a lockup clutch and a forward clutch in the continuously variable transmission.

2. Discussion of the Background Art

In an automatic transmission having a torque converter with a lockup clutch, when the lockup clutch is engaged, an engine crankshaft is directly connected with an input shaft of the transmission and when the lockup clutch is disengaged, the direct connection is released, i.e., the torque converter is operative. When the lockup clutch is disengaged, the friction devices such as a low clutch, a high clutch and the like are engaged or disengaged to establish speed ratios of the transmission. When these friction devices are changed over from a released condition to an engaged condition and vice versa, the automatic transmission often causes so-called changeover shocks. Further, the automatic transmission sometimes causes engine over-runs or engine stalls due to a slippage of the changeover timing.

Japanese Patent Application Laid-open No. Toku-Kai-Hei 1-98758 discloses a technology in which the timing for temporarily releasing the lockup clutch is adjusted to the changeover time of the shift valve by a shift switch signal of the automatic transmission so as to eliminate the changeover shocks, engine over-runs or the like.

However, this technology is composed of timely combining two different operations, a shift operation of the automatic transmission and a temporary release of the lockup clutch. Accordingly, this control technology can not be applied to a case of continuously variable transmission where two control strategies, lockup control and clutch control, are performed by only one ON-OFF valve or switch valve.

SUMMARY OF THE INVENTION

It is an object of the present invention to provide a clutch control apparatus of a continuously variable transmission having a torque converter with a lockup clutch, by which changeover shocks that may occur when the lockup clutch is engaged or engine over-runs that may occur when the lockup clutch is disengaged can be prevented.

In order to achieve the object, the clutch control apparatus of the continuously variable transmission according to the present invention comprises a changeover means for changing over an oil passage connected to an apply chamber and a release chamber from an engaged position to a released position and vice versa, a slip pressure regulating means for regulating a slip pressure to be supplied to the release chamber, a lockup control judging means for judging whether or not a lockup clutch is to be engaged or to be released according to traveling conditions of the vehicle and a control means for reducing the slip pressure after a specified time elapses since the oil passage is changed over to the engaged position, when the lockup control judging means judges that the lockup clutch is to be changed over from the released position to the engaged position.

DETAILED DESCRIPTION OF THE PREFERRED EMBODIMENT

Figure 1:
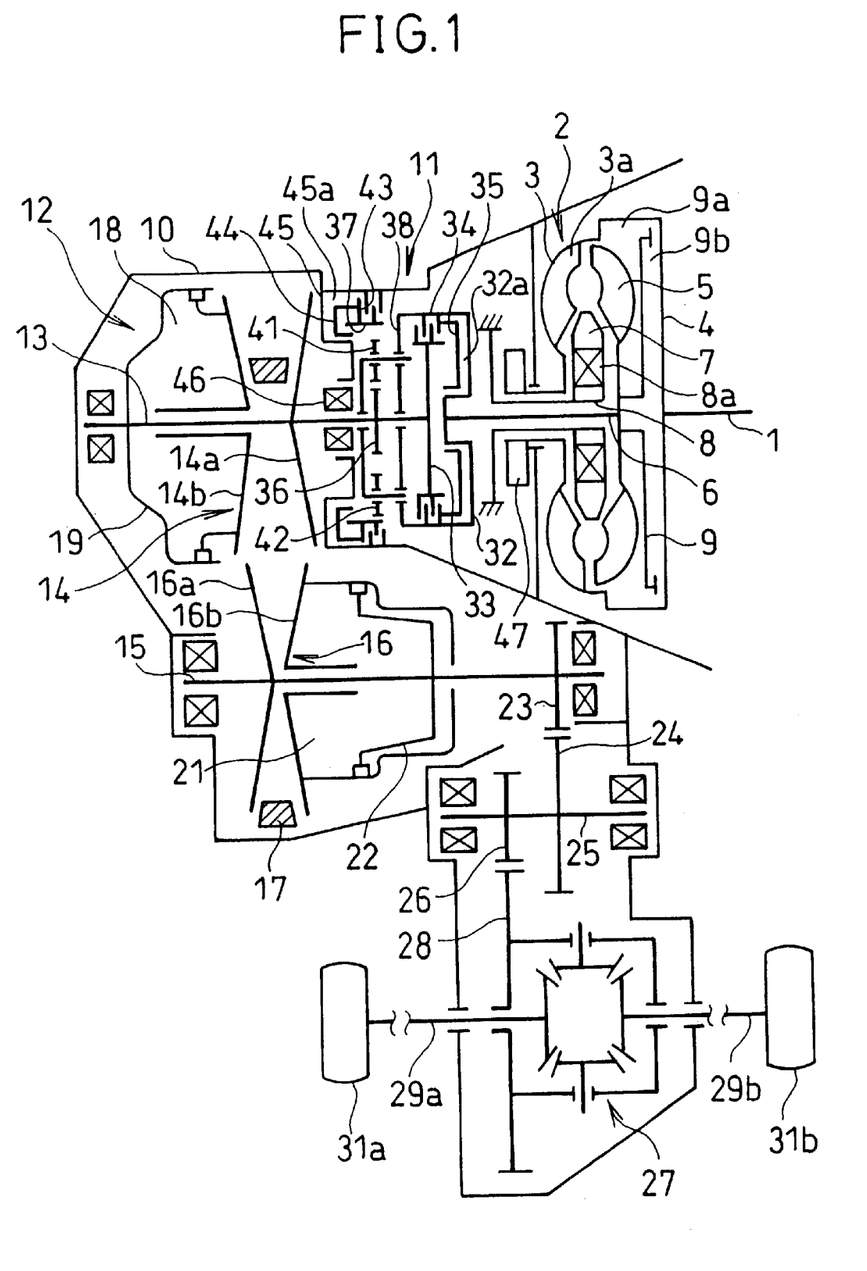
FIG. 1 is a schematic diagram showing a drive train of a continuously variable transmission for a vehicle.

Referring now to FIG. 1, a crankshaft 1 driven by an engine (not shown) is connected with a converter case 3 of a torque converter 2 on a pump side through a drive plate 4. A pump impeller 3a provide in the converter case 2 on the pump side is opposite to a turbine runner 5 connected with a turbine shaft 6. A stator 7 is disposed between the pump impeller 3a and the turbine runner 5 and is supported by an one-way clutch 8a mounted on a stator supporting shaft 8. Further, a lockup clutch 9 is mounted on the turbine shaft 6 slidably in the axial direction between an engaged position with the drive plate 4 and a released position therefrom. Thus, engine power is transmitted to the turbine shaft 6 through the torque converter 2 or the lockup clutch 9.

A chamber on one side of the lockup clutch 9 is called an apply chamber 9a and a chamber on the other side is called a release chamber 9b. The torque converter 2 is operative by supplying hydraulic pressure to the release chamber 9b and by circulating hydraulic pressure therefrom to the apply chamber 9a. On the other hand, the lockup clutch 9 is in a lockup condition by engaging the lockup clutch 9 with the drive plate 4 by supplying hydraulic pressure to the apply chamber 9a and also by reducing hydraulic pressure within the release chamber 9b. Further, a slip control of the lockup clutch 9 is available by causing a slip in the lockup clutch 9 by regulating pressure within this release chamber 9b.

The turbine shaft 6 is connected with an input shaft, i.e., a primary shaft 13 of the continuously variable transmission 12 through a forward and reverse changeover apparatus 11. The primary shaft 13 is provided with a primary pulley 14. The primary pulley 14 includes a fixed sheave 14a fixed on the primary shaft 13 and a displaceable sheave 14b mounted slidably in the axial direction on the primary shaft, opposite to the fixed sheave 14a, through a fitting means such as a ball spline. Thus, the space (groove width) between the fixed sheave 14a and the displaceable sheave 14b can be varied. Further, an output shaft, i.e., a secondary shaft 15 is disposed in parallel with the primary shaft 13. The secondary shaft 15 is provided with a secondary pulley 16. The secondary pulley 16 is includes a fixed sheave 16a and a displaceable sheave 16b mounted, opposite to the fixed sheave 16a, slidably in the axial direction in the same manner as the displaceable sheave 14b so as to vary the groove width of the secondary pulley 16. Reference numeral 10 denotes a transmission case for housing the overall drive train.

The primary pulley 14 is interconnected with the secondary pulley 16 through a drive belt 17 wound therearound.

The rotational speed of the secondary shaft 15 can be varied continuously with respect to the rotational speed of the primary shaft 14 by changing the ratio of the winding diameter of the primary pulley 14 to that of the secondary pulley 16 by varying the groove width of both pulleys 14, 16.

In order to vary the groove width of the primary pulley 14, a cylinder 19 forming a primary oil chamber 18 between the displaceable sheave 14b and the cylinder 19 is mounted on the primary shaft 13 and, in order to vary the groove width of the secondary pulley 16, a plunger 22 forming a secondary oil chamber 21 between the displaceable sheave 16b and the plunger 22 is mounted on the secondary shaft 15.

The secondary shaft 15 is connected with an intermediate shaft 25 through gears 23, 24 and a gear 26 mounted on the intermediate shaft 25 meshes with a final reduction gear 28 of a differential 27. The differential 27 has axle shafts 29a, 29b which are connected at outer ends thereof with wheels 31a, 31b, respectively.

The forward and reverse changeover apparatus 11 includes a clutch cylinder 32 provided on a forward clutch drum which is fixed to the turbine shaft 6 and a clutch hub 33 secured to the primary shaft 13 and a forward clutch 34 of multi-disc type is provided between the clutch cylinder 32 and the clutch hub 33. Further, a hydraulic piston 35 for actuating the forward clutch 34 is incorporated in the clutch cylinder 32. Therefore, when a hydraulic pressure is supplied to the clutch cylinder 32 to engage the forward clutch 34, the rotation of the turbine shaft 6 is transmitted to the primary shaft 13 through the clutch hub 33. As a result, the primary shaft 13 rotates in the same direction as the turbine shaft 6.

A sun gear 36 is secured to the primary shaft 13 and a ring gear 37 is rotatably along the outer periphery of the sun gear 36 in the transmission case 10. Further, a carrier 38 which is to the forward clutch drum having the clutch cylinder 32 is rotatably connected with planetary pinions 41, 42 meshing with each other. The pinion 41 meshes with the sun gear 36 and the other pinion 42 meshes with the ring gear 37. Thus, a double pinion type planetary gear set is constituted by these gears. In a preferred embodiment, as shown in FIG. 1, a plurality of sets of pinions 41,42 are arranged around the sun gear 36.

There is provided a multi-disc type reverse brake 43 between the ring gear 37 and the transmission case 10 and a hydraulic piston 44 for actuating the reverse brake 43 is incorporated in a brake cylinder 45 formed on the transmission case 10. Accordingly, when a hydraulic pressure is supplied to an oil chamber 45a of the brake cylinder 45 to hold the reverse brake 43 in the brake condition, while the forward clutch 34 is disengaged, the ring gear 37 is fixed to the transmission case 10 and as a result the carrier 38 is rotated together with the turbine shaft 6. At this moment, since paired pinions 41, 42 are revolved around the sun gear 36 while the pinion 41 is rotated in the opposite direction, the sun gear 36, i.e., the primary shaft 13 rotates in the reverse direction with respect to the rotational direction of the turbine shaft 6. The forward clutch 34 and the reverse brake 43 are friction engagement elements of the forward and reverse changeover apparatus 11.

As a hydraulic power source for operating the brake cylinder 45, the clutch cylinder 32 and the like, an oil pump 47 is disposed in the transmission case 10. The oil pump 47 is driven by the crankshaft 1 via the pump impeller case 3.

Figure 2:
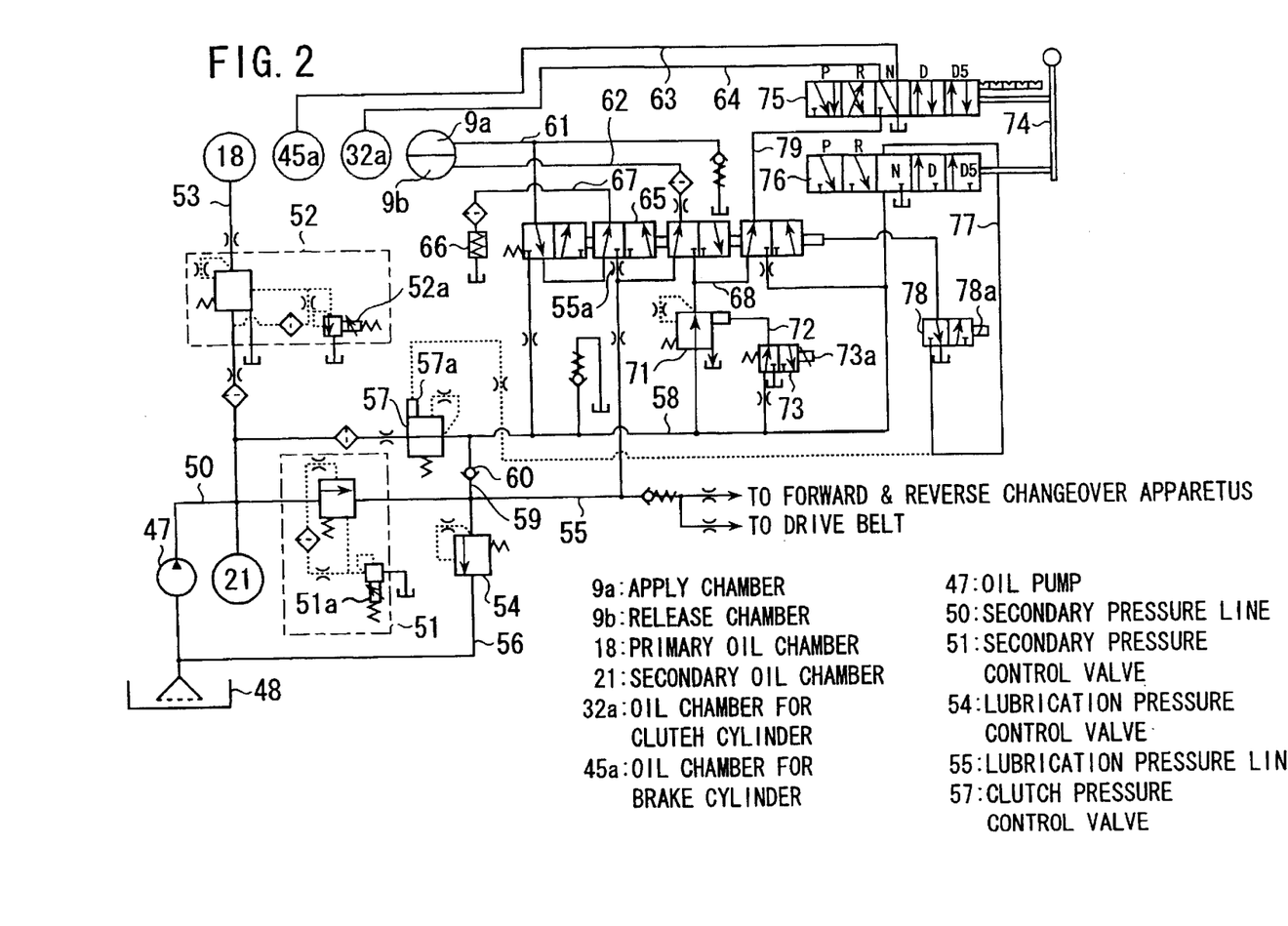
FIG. 2 is a hydraulic circuit diagram of a hydraulic control apparatus for controlling an operation of the drive train shown in FIG. 1 when a selector lever is in a neutral position.

FIG. 2 is a schematic diagram showing a hydraulic circuit for controlling the drive train shown in FIG. 1. The hydraulic fluid pumped up from an oil pan 48 is supplied to a secondary pressure line 50. The secondary pressure line 50 is connected with the secondary oil chamber 21 (see FIG. 1) for actuating the displaceable sheave 16b of the secondary pulley 16 and a secondary pressure port of a secondary pressure control valve 51. The secondary pressure control valve 51 acts as regulating the secondary pressure at a specified value within a range of 1 to 3 Mpa (Megapascal) for example. This value corresponds to a power transmitting capacity of the drive belt 17. That is, when the engine power is large, like in case of hill climbing or sharp acceleration, the secondary pressure is raised to prevent the drive belt 17 from slipping and when the engine power is small, the secondary pressure is decreased to prevent a power loss of the oil pump 47 and to raise a power transmitting efficiency.

The secondary pressure line 50 is connected with a secondary pressure port of a primary pressure control valve 52. The primary pressure control valve 52 is connected at a primary pressure port thereof with a primary pressure line 53. The primary pressure line 53 is connected with the primary oil chamber 18 (see FIG. 1) for actuating the displaceable sheave 14b of the primary pulley 14. The primary pressure regulated by the primary pressure control valve 52 is supplied to the primary oil chamber 18. Since this primary pressure is a regulated or reduced pressure of the secondary pressure, it never exceeds the secondary pressure. Since the pressure receiving area of the primary oil chamber 18 is established to be larger than that of the secondary oil chamber 21, the clamping force of the drive belt 17 in the primary pulley 14 can be larger than that in the secondary pulley 16. Thus, since the pressure receiving area of the primary oil chamber 18 is established to be large, compared to that of the secondary oil chamber 21, the primary pressure is a primary factor for determining a target speed ratio of the continuously variable transmission.

The secondary pressure control valve 51 and primary pressure control valve 52 include an electromagnetic type relief valve for establishing secondary pressure and primary pressure according to current values supplied to proportional type solenoids 51a and 52a, respectively. In this case, well known duty solenoids may be used in place of the proportional type solenoids.

On the drain side of the secondary pressure control valve 51, there is provided a lubrication oil pressure control valve 54 acting as a relief valve. A lubrication oil pressure supplied to a lubrication pressure line 55 is adjusted to 0.2 to 0.4 Mpa by the lubrication oil pressure control valve 54 and fed to the drive belt 17, the planetary gear assembly of the forward and reverse changeover apparatus 11 and the release chamber 9b when the lockup clutch 9 is released.

The secondary pressure line 50, as shown in FIG. 2, is connected with a clutch pressure control valve 57 which serves as a pressure reducing valve. By supplying a pilot pressure from the outside to the clutch pressure control valve 57, for example, a clutch pressure as low as 0.7 Mpa is supplied to the clutch pressure line 58 and by stopping the supply of the pilot pressure from the outside, for example, a clutch pressure as high as 1.2 Mpa is supplied to the clutch pressure line 58.

Further, there is provided a bypass line 59 across the clutch pressure line 58 and the lubrication pressure line 55. The bypass line 59 is provided with a check valve 60 for blocking the hydraulic fluid flowing from the clutch pressure line 58 to the lubrication pressure line 55 and for allowing the hydraulic fluid to flow from the lubrication pressure line 55 to the clutch pressure line 58 only when the lubrication pressure is higher than the clutch pressure.

As shown in FIG. 2, there are provided an apply pressure line 61 connected with the apply chamber 9a, a release pressure line 62 connected with the release chamber 9b, a brake changeover pressure line 63 connected with the brake oil chamber 45a for actuating the reverse brake 43, a clutch changeover pressure line 64 connected with the clutch oil chamber 32a for actuating the forward clutch 34 and a switch valve 65 for controlling the connection with the lubrication pressure line 55 and the clutch pressure line 58.

Figure 3:
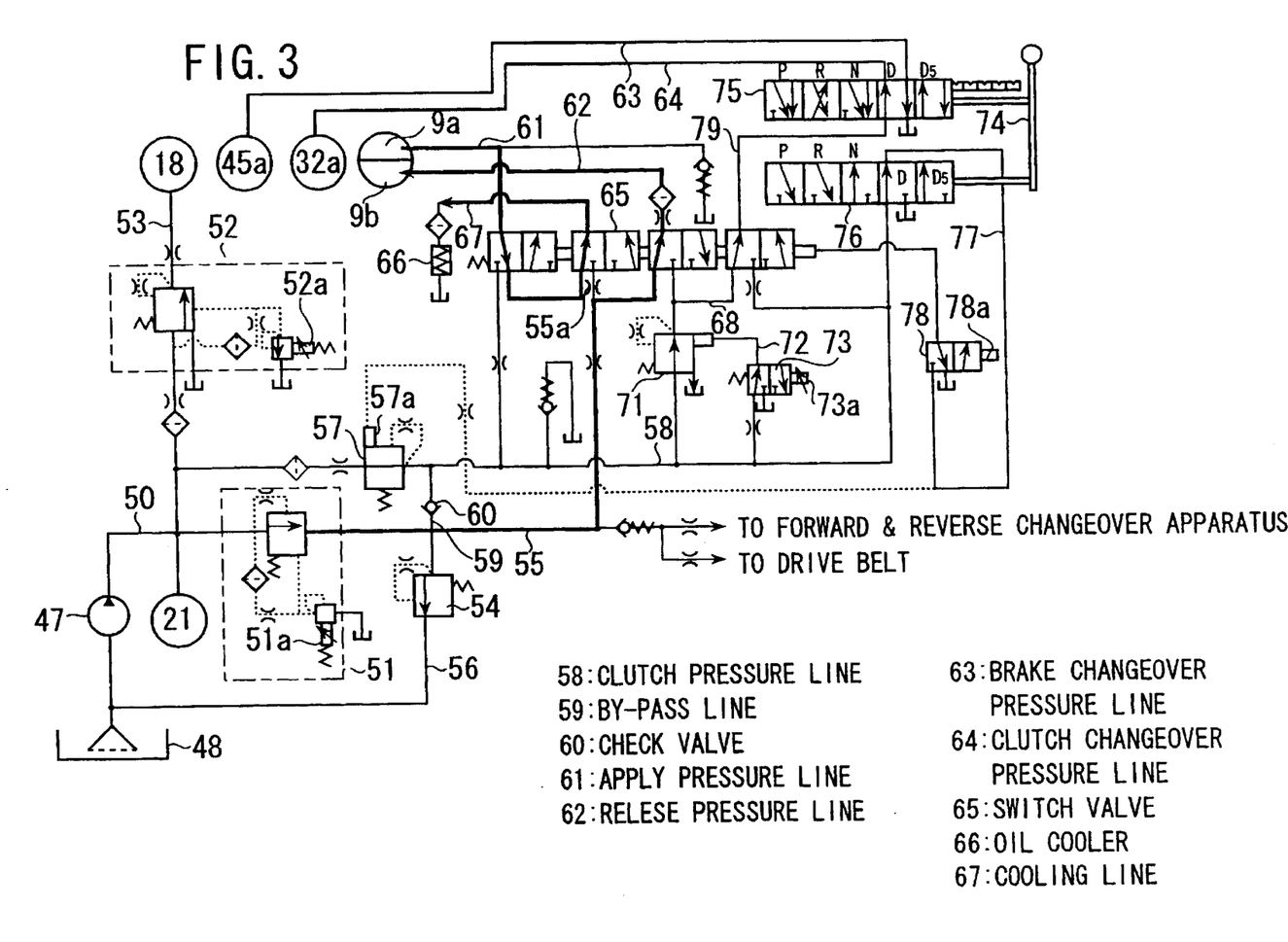
FIG. 3 is a hydraulic circuit diagram showing the hydraulic control apparatus in a F & R mode.
Figure 4:
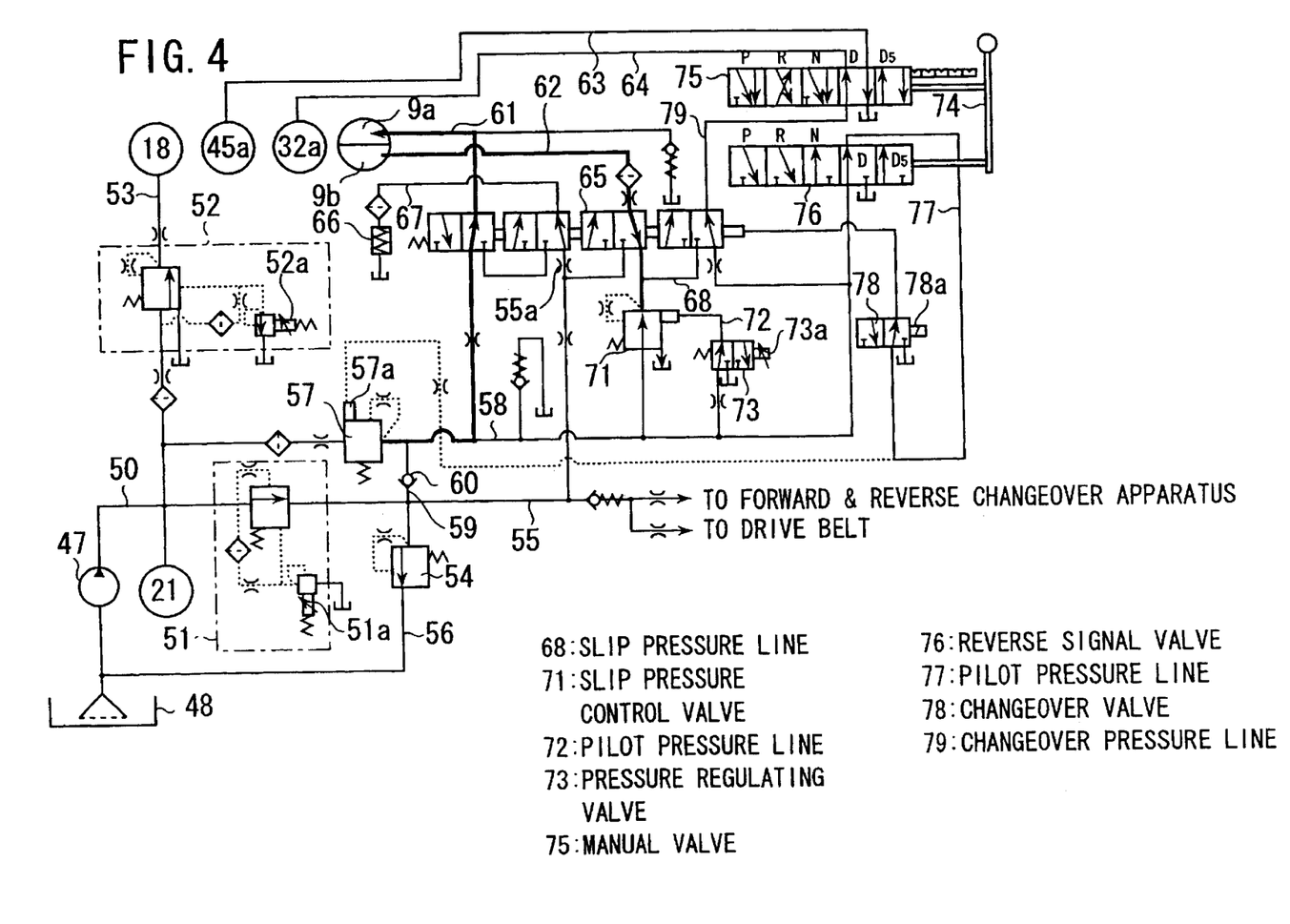
FIG. 4 is a hydraulic circuit diagram showing the hydraulic control apparatus in a lockup mode.

The switch valve 65 is composed of four elements having three-port selector valves, taking two positions: one is a released position of the lockup clutch 9 under the condition where the outside pilot pressure is not applied, that is, the condition where the vehicle speed is lower than a specified value, as shown in FIG. 2 and FIG. 3 and another is an engaged position of the lockup clutch 9 under the condition where the outside pilot pressure is applied, as shown in FIG. 4.

When the lockup clutch 9 is in the released position, as shown in FIG. 3, the lubrication pressure line 55 communicates with the release pressure line 62 through the switching valve 65 and a cooler line 67 having an oil cooler 66 communicates with the apply pressure line 61. In this state, the hydraulic circuit turns to an F & R mode in which the torque converter 2 is operative and the hydraulic control of the forward and reverse changeover apparatus 11 is available. At this time, the hydraulic pressure of the lubrication pressure line 55 is supplied to the release chamber 9b, it is discharged from the apply chamber 9a and is returned to the oil pan 48 through the oil cooler 66.

On the other hand, when the lockup clutch 9 is in the engaged position, as illustrated in FIG. 4, the clutch pressure line 58 communicates with the apply pressure line 61 and the clutch pressure is supplied to the apply chamber 9a. At this moment, a slip pressure line 68 connected with the clutch pressure line 58 communicates with the release pressure line 62. The slip pressure line 68 is provided with a slip pressure control valve 71 for adjusting the slip pressure supplied to the slip pressure line 68 to a required pressure ranging from the same pressure as the clutch pressure to a zero pressure according to the outside pilot pressure supplied to the outside pilot chamber of the slip pressure control valve 71. When the slip pressure becomes zero, the lockup clutch 9 is in the engaged position, i.e., in the lockup condition. On the other hand, the slip pressure becomes the same as the clutch pressure, the lockup clutch 9 is released. Thus, the slip control of the lockup clutch 9, in which the rotational difference of the lockup clutch 9 is controlled to be constant by properly regulating the slip pressure, can be performed.

When the switch valve 65 is in the lockup condition, the lubrication pressure line 55 communicates with the cooler line 67 via the switch valve 65. A restrictor 55a is provided at the inlet of the switch valve 65.

In order to supply the outside pilot pressure to the slip pressure control valve 71, a pilot pressure line 72 is connected across the pilot port of the slip pressure control valve 71 and the clutch pressure line 58. The pilot pressure line 72 is provided with a solenoid-operated pressure regulating valve 73. In this embodiment, the solenoid used for the pressure regulating valve 73 is a duty type solenoid which regulates the pressure by changing the duty ratio of the current supplied to the solenoid but alternatively the solenoid may be a proportional type solenoid which is employed in the secondary pressure control valve 51.

In the passenger compartment, there is provided with a mode selecting control lever, i.e., a selector lever 74. The selector lever 74 is interconnected with a manual valve 75 and a reverse signal valve 76, respectively. Respective valves 75, 76 operates in five positions each of which corresponds to drive ranges "P" (parking), "R" (reverse), "N" (neutral), "D" (drive) and "Ds" (sport drive) selected by the selector lever 74.

The clutch pressure line 58 communicates with a pilot pressure line 77 via the reverse signal valve 76 and the pilot pressure line 77 is provided with a three-port type solenoid-operated changeover valve 78 and a changeover means is constituted by the switch valve 65 and the changeover valve 78. When a solenoid 78a of the changeover valve 78 is energized, the switching valve 65 is in the lockup control position, that is, the lockup engaged position, as shown in FIG. 4 and when it is deenergized, the switching valve 65 is in the F & R mode position (where no pilot pressure is applied), as shown in FIG. 2 and FIG. 3. The pilot pressure line 77 is connected with the outside pilot chamber 57a of the clutch pressure control valve 57 as illustrated in a broken line. When the reverse signal valve 76 is positioned at either of "N" , "D" and "Ds" ranges, the clutch pressure is supplied to the outside pilot chamber 57a and as a result the clutch pressure is established to a low pressure like 0.7 MPa. On the other hand, when the reverse signal valve 76 is positioned at "P" or "R" ranges, the hydraulic pressure is not supplied to the outside pilot chamber 57a of the clutch pressure control valve 57 and as a result the clutch pressure is set to a high pressure like 1.2 MPa.

There is provided a common changeover pressure line 79 across the switching valve 65 and the manual valve 75. The changeover pressure line 79 communicates with the slip pressure line 68, when the switch valve 65 is switched over to the F & R Mode position, as shown in FIG. 3 and the switch valve 65 communicates with the clutch pressure line 58, when the switch valve 65 is switched over to the lockup control position, as shown in FIG. 4. Further, the changeover pressure line 79 communicates with the clutch changeover pressure line 64 through the manual valve 75, when the selector lever 74 is shifted to either "D" or "Ds" range and the changeover pressure line 79 communicates with the brake changeover pressure line 63, when the selector lever 74 is shifted to "R" range.

In the vehicle having the hydraulic control circuit described above, in case where "D" range is selected as shown in FIG. 4, and further in case where "Ds" or "N" range is selected through the operation of the select lever 74, the clutch pressure line 58 communicates with the pilot pressure line 77 via the reverse signal valve 76 and the clutch pressure is fed to the outside pilot chamber 57a of the clutch pressure control valve 57. As a result, a low clutch pressure is fed to the clutch pressure line 58. Accordingly, in case where a forward traveling position, "D" or "Ds" range is established by the operation of the selector lever 74, a low clutch pressure is supplied to the oil chamber 32a of the forward clutch 34 via the clutch pressure line 58, the slip pressure line 68 and the changeover pressure line 79.

On the other hand, when the select lever 74 is selected at "P" or "R" range, the reverse signal valve 76 closes the communication between the clutch pressure line 58 and the pilot pressure 77 so that the outside pilot chamber 57a of the clutch pressure control valve 57 is in the drain condition, thereby a high clutch pressure is supplied to the clutch pressure line 58. Accordingly, in case where the select lever 74 is at "R" range, the high clutch pressure is supplied to the oil chamber 45a of the reverse brake 43 through the clutch pressure line 58, slip pressure line 68 and changeover pressure line 79.

Figure 5:
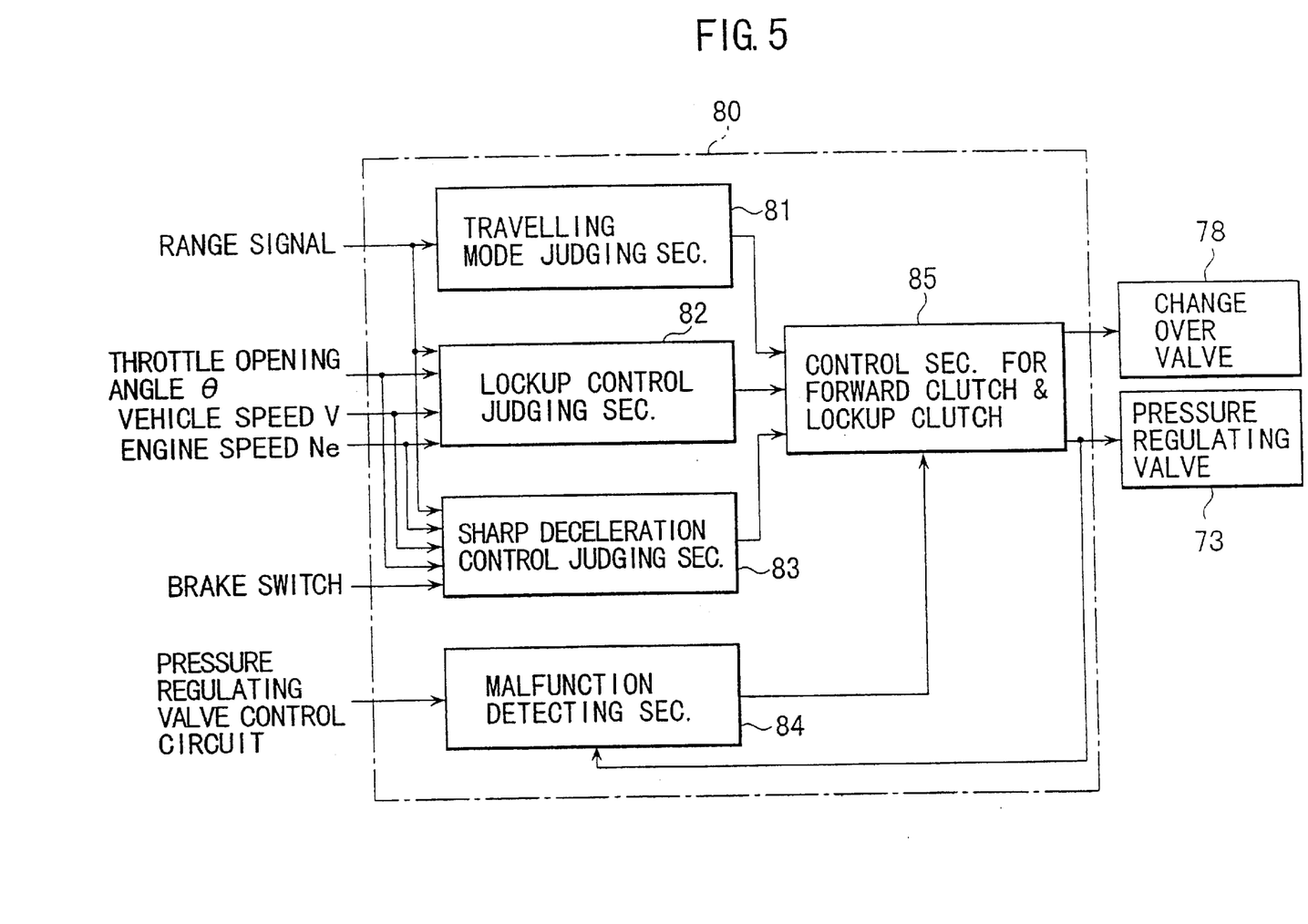
FIG. 5 is a block diagram of a clutch control apparatus.

FIG. 5 is a block diagram showing a control circuit of a clutch control section 80 for controlling a changeover valve 78 to operate the switch valve 65 and for controlling a pressure regulating valve 73 to operate the slip pressure control valve 71.

The clutch control section 80 has a traveling mode judging section 81 to which a range signal is inputted by the operation of the selector lever 74, a lockup control judging section 82 to which a signal of the engine throttle opening angle θ, a signal of the engine speed Ne and a signal of the vehicle speed V are inputted respectively, a sharp deceleration control judging section 83 to which a brake switch signal is inputted, and a malfunction detecting section 84 for detecting malfunctions of the pressure regulating valve 73.

Output signals from the lockup control judging section 82, sharp deceleration control judging section 83 and malfunction detecting section 84, are inputted to a forward clutch & lockup clutch control section 85. The changeover valve 78 and pressure regulating valve 73 are controlled by output signals from this control section 85.

Figure 6:
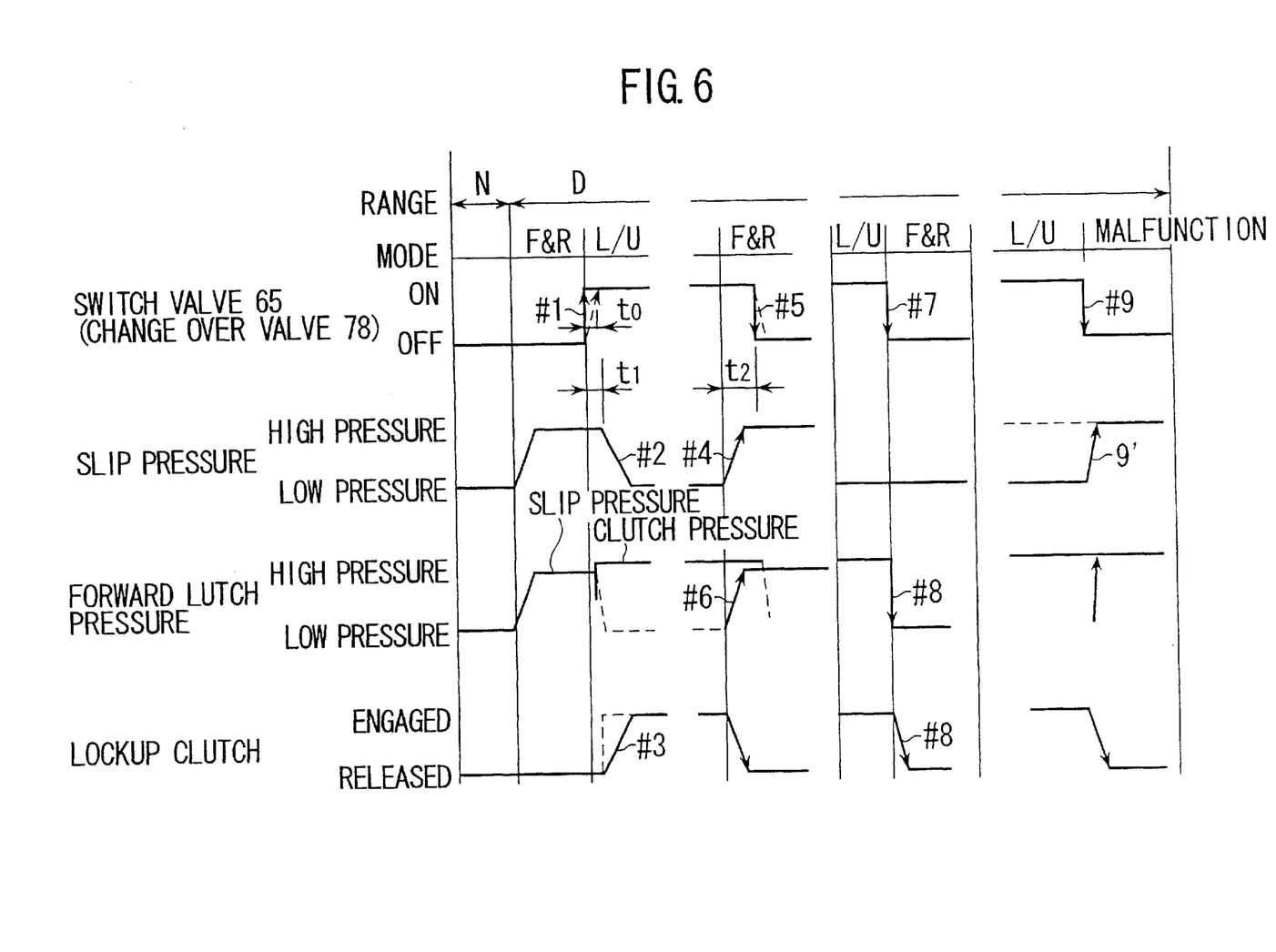
FIG. 6 is a time line sequence showing a relationship between the ON-OFF operation of a changeover valve and the change of slip pressure.

FIG. 6 is a time line sequence illustrating the ON-OFF operation of the changeover valve 78 and the change of slip pressure by the pressure regulating valve 73.

As shown in FIG. 2, when "N" range is selected, the changeover valve 78 is in an OFF position and the switch valve 65 is in a released position. Therefore, the lockup clutch 9 is a released position and the slip pressure established by the slip pressure control valve 71 is in a low pressure.

When the selector lever 74 selects "D" range, as shown in FIG. 3, the switch valve 65 is switched to a F & R mode. Although the switch valve 65 is still in the released position, the slip pressure is supplied to the clutch cylinder 32 through the switch valve 65 so as to engage the forward clutch 34. This slip pressure is established to a high pressure by the pressure regulating valve 73 to which duty signals are supplied according to the engine speed Ne and throttle opening angle θ.

When the vehicle speed exceeds a specified value, an operation signal is outputted from the clutch control section 80 to the changeover valve 78 and the changeover valve 78 is turned ON (operative) so as to changeover the lockup clutch 9 from the released condition to the engaged condition. Then, as shown by #1 of FIG. 6, a pilot pressure is supplied to the switch valve 65 and as a result, the switch valve 65 is turned ON, namely, in the engaged position or switched to the lockup mode. However, in the real world, there is a certain delay time $t_0$ since the output signal is issued from the clutch control section 80 until the switch valve 65 is completely changed over, as shown by a broken line of FIG. 6.

When the switch 65 is changed over, the clutch pressure regulated by the clutch pressure control valve 57 is supplied to the apply chamber 9a and the hydraulic pressure within the release chamber 9b is returned to the oil pan 48 through the slip pressure control valve 71. The slip pressure is not changed since the operation signal is sent from the clutch control section 80 to the changeover valve 78 until a specified delay time $t_1$ has elapsed. When the delay time $t_1$ has elapsed, such an operation signal as varying the duty ratio is sent from the clutch control section 80 to the pressure regulating valve 73. As a result, as shown by #2, the slip pressure is controlled so as to be reduced gradually.

In this way, since the slip pressure supplied to the apply chamber 9a is controlled so as to be gradually reduced, the lockup clutch 9 is smoothly engaged as shown by #3 without causing an engagement shock. When the slip changeover time has elapsed, the slip pressure becomes low. The delay time $t_1$ is established to be equal to or longer than the delay time $t_0$ until which the switch valve 65 is finished to be changed over. Accordingly, the lockup clutch 9 achieves an ensured and smooth engagement, covering an error of operation time of the switch valve 65. As shown in FIG. 6, after the changeover to the lockup mode, since the switch valve 65 is changed over to the ON position, a clutch pressure higher than the slip pressure is applied to the clutch cylinder 32 of the forward clutch 34.

Further, when the vehicle speed goes down below a specified value while the vehicle travels in the lockup mode, the switch valve 65 is changed over to the F & R mode. First, as shown by #4 in FIG. 6, the slip pressure is controlled by the pressure regulating valve 73 based on an operation signal from the clutch control section 80 so as to increase the slip pressure gradually from a low pressure to a high pressure, after a specified delay time $t_2$ has elapsed from the issuance of an operation signal from the clutch control section 80, the change over valve 78 is turned OFF as shown by #5, that is, the switch valve 65 is turned OFF, as a result the lockup clutch 9 is changed over from the engaged position to the released position and thus the changeover to F & R mode is finished.

Thus, the slip pressure of the slip pressure line 68 is changed over to a high pressure by the slip control valve 71 before the switch valve 65 is changed over to the F & R mode and when the switch valve 65 is changed over to F & R mode, then the lockup clutch 9 has already been released. Further, at this moment, the slip pressure which has been changed over to the high pressure side is supplied to the forward clutch 34, as shown by #6, thereby the hydraulic pressure applied to the forward clutch 34 is prevented from dropping and an engine racing can be avoided.

Further, when the sudden deceleration control judging section 83 judges that the vehicle has been suddenly decelerated during travelling in the lockup mode, the changeover valve 78 is turned OFF as shown by #7 in FIG. 6, i.e., the switch valve 65 is turned OFF or changed over to F & R mode, namely, to the released position and the supply of hydraulic pressure to the apply chamber 9a is stopped. Further, the slip pressure is held at a low pressure by the slip pressure control valve 71. As a result, both forward clutch 34 and lockup clutch 9 are released, as shown by #8, thereby the engine stall can be avoided.

In the control described above, when a malfunction of the pressure regulating valve 73 is judged by the malfunction detecting section 84, the changeover valve 78 is turned OFF as shown by #9, irrespective of F & R mode, lockup mode and other modes and the switch valve 65 is changed over to the released position, being fixed in the F & R mode. When the duty ratio supplied to the pressure regulating valve 73 becomes zero, the slip pressure is fixed on the high pressure side as shown by #9' and as a result the lockup clutch 9 is released, thereby a drag phenomenon of the lockup clutch 9 which may occur when the vehicle travels at low speeds can be prevented.

Figure 7:
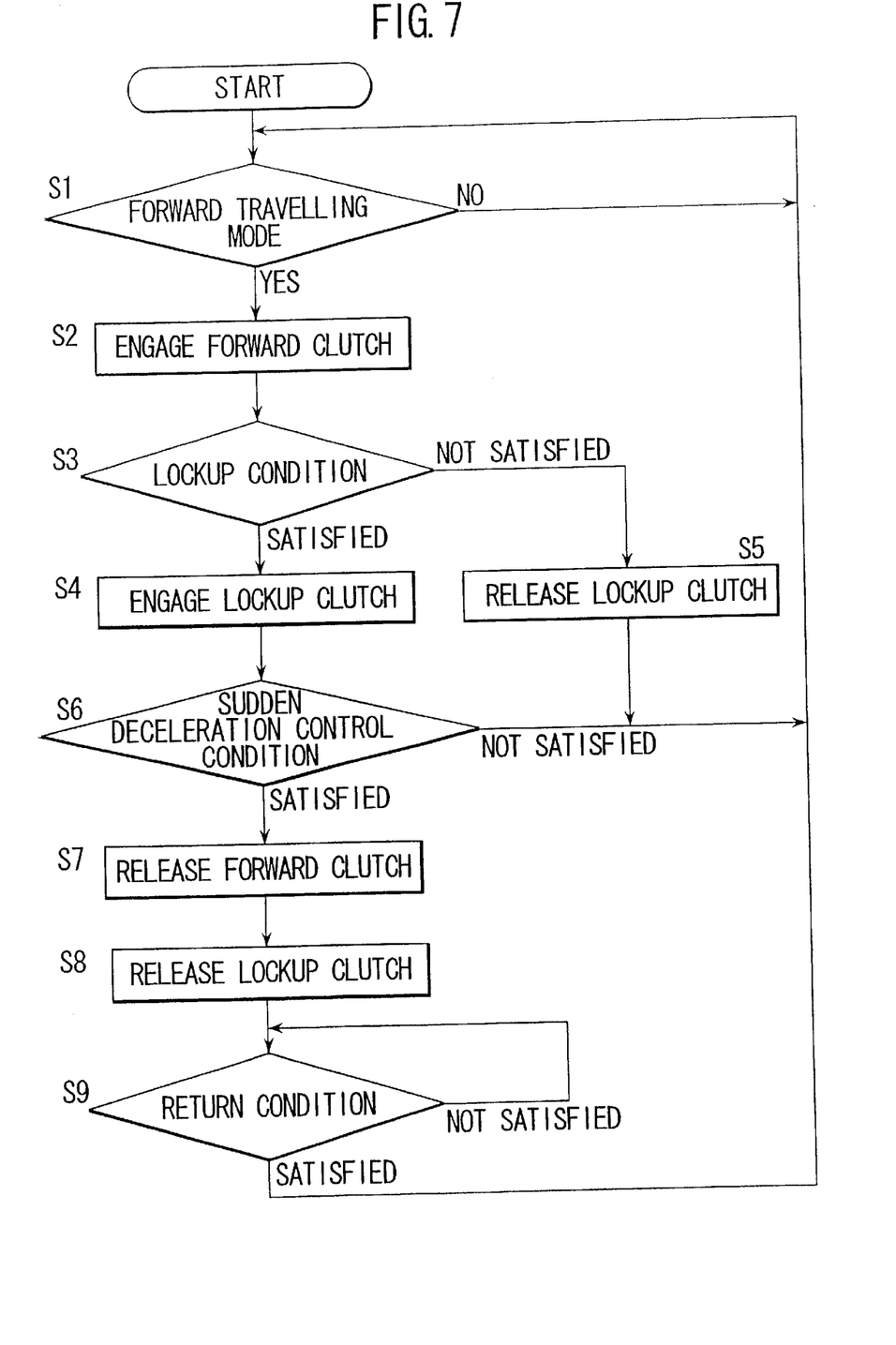
FIG. 7 is a flowchart showing a main routine of control processes of a clutch control apparatus.

FIG. 7 is a flowchart showing a main routine of the control process of the clutch control apparatus. When it is judged at a step S1 that the forward traveling mode is selected, the program goes to a step S2 where the forward clutch 34 is established to the engaged condition. At a step S3, when it is judged that the vehicle speed reaches the lockup condition, at a step S4 the traveling mode is changed over to the lockup mode and the lockup clutch 9 is established to the engaged condition. On the other hand, when it is judged at the step S3 that the vehicle has not yet reached the lockup condition, the program goes to a step S5 where the lockup clutch 9 is maintained in the released condition.

If it is judged at a step S6 that the sudden deceleration control condition is satisfied, both forward clutch and lockup clutch are changed over to the released condition at steps S7 and S8, respectively. Further, if it is judged at a step S9 that the sudden deceleration control is canceled to return to a normal control, the program goes back to the step S1.

Figure 8:
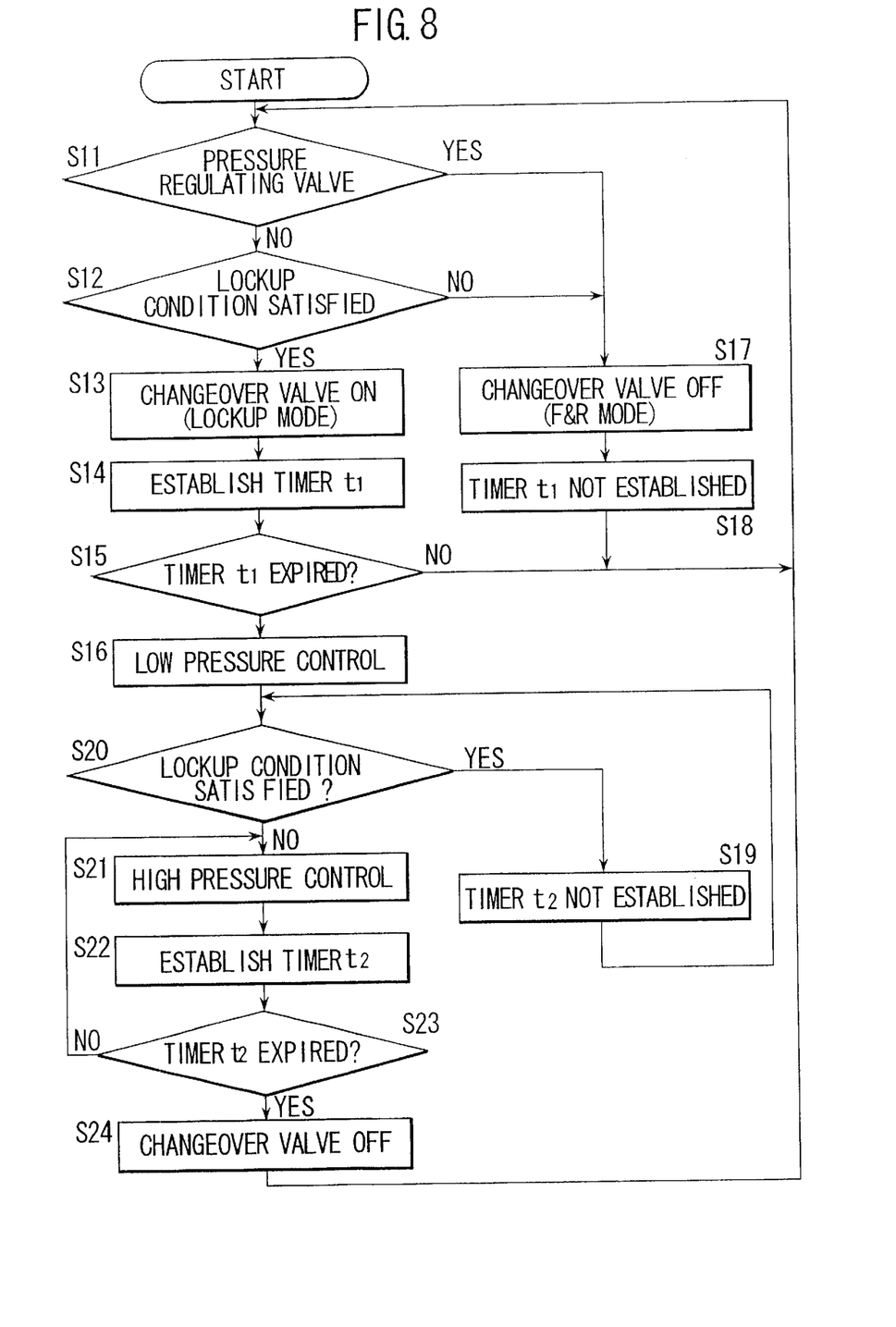
FIG. 8 is a flowchart showing a subroutine of control processes of a clutch control apparatus.

FIG. 8 is a flowchart showing a subroutine of the clutch control apparatus, in which if it is judged at a step S11 that the pressure regulating valve 73 normally operates and if is judged at the next step S12 that the lockup condition is satisfied, then at a step S13 the changeover valve 78 is turned ON (lockup mode) and at the next step S14 the timer $t_1$ is established. Next, at a step S14, when it is judged that the timer $t_1$ has expired, the program goes to a step S16 where the low pressure control is carried out by the pressure regulating valve 73 to engage the lockup clutch 9. On the other hand, if it is judged at the step S11 that the pressure regulating valve 73 malfunctions, or if it is judged at the step S12 that the lockup condition is not satisfied, the program goes to a step S17 where the changeover valve 78 is turned OFF (F & R mode).

The lockup engaged condition started at the step S16 is carried out through a step S19 until the lockup condition is not released at S20. When it is judged at S20 that the lockup condition has been released, at a step S21 the slip pressure is changed over to the high pressure side by the pressure regulating valve 73 and at a step S22 the timer $t_2$ is established. When it is judged at a step S23 that the timer $t_2$ has expired, the changeover valve 78 is turned OFF and the switch valve 65 is changed over to F & R mode.

In summary, according to the present invention, the lockup clutch of the torque converter can be changed over smoothly from the released condition to the engaged condition without causing engagement shocks. Engine over-runs that may occur when the lockup clutch is changed over from the engaged condition to the released condition can be prevented. Further, engine stalls that may occur when the vehicle is suddenly decelerated can be prevented. Further, when the slip pressure regulating means malfunctions, the lockup clutch also can be prevented from causing drags. Thus, several items of vehicle driveability can be improved.

While the presently preferred embodiment of the present invention has been shown and described , it is to be understood that this disclosure is for the purpose of illustration and that various changes and modifications may be made without departing from the scope of the invention as set forth in the appended claims.

What is claimed is:

1. A clutch control apparatus for a continuously variable transmission of a vehicle having a torque converter with a lockup clutch, a forward and reverse changeover apparatus with a forward clutch, a primary pulley, a secondary pulley, a drive belt interconnected said primary pulley with said secondary pulley, an apply chamber for introducing a hydraulic pressure to establish said lockup clutch to an engaged position and a release chamber for introducing a hydraulic pressure to establish said lockup clutch to a released position, comprising:

changeover means for changing over an oil passage connected to said apply chamber and said release chamber from said engaged position to said released position and vice versa;

slip pressure regulating means for regulating a slip pressure to be supplied to said release chamber;

lockup control judging means for judging whether or not said lockup clutch is to be engaged or to be released according to traveling conditions of said vehicle; and control means for reducing said slip pressure after a specified time elapses since said oil passage is changed over to the engaged position, when said lockup control judging means judges that said lockup clutch is to be changed over from said released position to said engaged position, so as to secure said engaged position of said lock-up clutch.

2. A clutch control apparatus for a continuously variable transmission of a vehicle having a torque converter with a lockup clutch, a forward and reverse changeover apparatus with a forward clutch, a primary pulley, a secondary pulley, a drive belt interconnected said primary pulley with said secondary pulley, an apply chamber for introducing a hydraulic pressure to establish said lockup clutch to an engaged position and a release chamber for introducing a hydraulic pressure to establish said lockup clutch to a released position, comprising:

changeover means for changing over an oil passage connected to said apply chamber and said release chamber from said engaged position to said released position and vice versa and for changing over an oil passage of said forward clutch to said engaged position;

slip pressure regulating means for regulating a slip pressure to be supplied to said release chamber and said forward clutch respectively;

lockup control judging means for judging whether or not said lockup clutch is to be engaged or to be released according to traveling conditions of said vehicle; and control means for changing over said oil passage to said released position after a specified time elapses since said slip pressure is increased, when said lockup control judging means judges that said lockup clutch is to be changed over from said engaged position to said released position, so as to secure an engagement of said forward clutch and quickly to change over said lock-up clutch to said release position.

3. A clutch control apparatus for a continuously variable transmission of a vehicle having a torque converter with a lockup clutch, a forward and reverse changeover apparatus with a forward clutch, a primary pulley, a secondary pulley, a drive belt interconnected said primary pulley with said secondary pulley, an apply chamber for introducing a hydraulic pressure to establish said lockup clutch to an engaged position and a release chamber for introducing a hydraulic pressure to establish said lockup clutch to a released position, comprising:

changeover means for changing over an oil passage connected to said apply chamber and said release chamber from said engaged position to said released position and vice versa and for changing over an oil passage of said forward clutch to said engaged position;

slip pressure regulating means for regulating a slip pressure to be supplied to said release chamber;

sudden deceleration control judging means for detecting a sudden deceleration of said vehicle; and control means for controlling said slip pressure at a predetermined pressure under a lockup condition where said lockup clutch is in said engaged position and for changing over said oil passage to said released position and holding said slip pressure at said predetermined pressure when said sudden deceleration control judging means judges a sudden deceleration of said vehicle under the lockup condition.

4. A clutch control apparatus for a continuously variable transmission of a vehicle having a torque converter with a lockup clutch, a forward and reverse changeover apparatus with a forward clutch, a primary pulley, a secondary pulley, a drive belt interconnected said primary pulley with said secondary pulley, an apply chamber for introducing a hydraulic pressure to establish said lockup clutch to an engaged position and a release chamber for introducing a hydraulic pressure to establish said lockup clutch to a released position, comprising:

changeover means for changing over an oil passage connected to said apply chamber and said release chamber from said engaged position to said released position and vice versa;

slip pressure regulating means for regulating a slip pressure to be supplied to said release chamber;

malfunction detecting means for detecting a malfunction of said slip pressure regulating means; and control means for controlling said slip pressure at a predetermined pressure under a lockup condition where said lockup clutch is in said engaged position and for changing over said oil passage to said released position and holding said slip pressure at a pressure higher than said predetermined pressure when said malfunction detecting means detects said malfunction of said slip pressure regulating means.

* * * * *